United States Patent [19]

Christensen et al.

[11] Patent Number: 4,898,754
[45] Date of Patent: Feb. 6, 1990

[54] POLY(AMIDE-IMIDE) PREPREG AND COMPOSITE PROCESSING

[75] Inventors: Stephen Christensen, Woodinville, Wash.; Jay O. Rakel, Warrenville, Ill.; Dale E. Hartz, Kent, Wash.

[73] Assignee: The Boeing Company, Seattle, Wash.

[21] Appl. No.: 190,531

[22] Filed: May 5, 1988

Related U.S. Application Data

[63] Continuation of Ser. No. 913,287, Sep. 30, 1986, abandoned.

[51] Int. Cl.$^4$ .............................................. B29D 9/00
[52] U.S. Cl. ................................... 427/369; 427/370;
427/374.1; 427/374.2; 427/374.3; 427/379;
427/385.5; 427/389.8; 427/389.9; 427/389.1;
428/287; 428/290; 428/473.5; 523/222;
523/309; 524/600
[58] Field of Search ................ 428/287, 290, 473.5;
523/222, 309; 524/600; 427/369, 374.1, 374.2,
374.3, 370

[56] References Cited

U.S. PATENT DOCUMENTS

| | | | |
|---|---|---|---|
| 3,764,449 | 10/1973 | Copeland et al. | 161/88 |
| 3,764,573 | 10/1973 | Jablonski | 260/37 N |
| 3,770,691 | 11/1973 | Mcloughlin | 260/37 N |
| 3,904,577 | 9/1975 | Buisson | 131/10 |
| 3,930,097 | 12/1975 | Alberino et al. | 428/260 |
| 4,097,456 | 6/1978 | Barie, Jr. | 428/474 |
| 4,309,473 | 1/1982 | Minamisawa et al. | 156/307.5 |
| 4,384,061 | 5/1983 | Reiter et al. | 428/378 |
| 4,460,638 | 7/1984 | Haluska | 428/224 |
| 4,600,617 | 7/1986 | Cole | 428/408 |
| 4,601,945 | 7/1986 | Pike | 156/307.5 |
| 4,765,942 | 8/1988 | Christensen et al. | 264/510 |

FOREIGN PATENT DOCUMENTS 2905857  8/1979  Fed. Rep. of Germany ...... 428/290

*Primary Examiner*—John C. Bleutge
*Assistant Examiner*—David W. Woodward
*Attorney, Agent, or Firm*—Seed and Berry

[57] ABSTRACT

A method is disclosed for forming poly(amide-imide) prepregs that permits forming void-free composites having residual solvent contents of less than 0.2% by weight. Such composite have improved glass transition temperatures near those of the pure polymer. In a preferred method, a poly(amide-imide) prepreg containing a residual N-methyl-2-pyrrolidone solvent is rapidly heated to about 650° F. to evaporate residual solvent to less than 1.0% by weight. The prepreg is rapidly cooled before the thermoplastic poly(amide-imide) polymer begins to significantly advance in molecular weight. The prepreg may then be layed up to form composite articles that are consolidatable by application of further heat and pressure.

10 Claims, No Drawings

POLY(AMIDE-IMIDE) PREPREG AND COMPOSITE PROCESSING

This application is a continuation of U.S. Patent application Ser. No. 913,287, filed Sept. 30, 1986 now abandoned.

TECHNICAL FIELD

The invention relates to composite articles formed of layers of fibrous reinforcing material impregnated with solutions containing thermoplastic resins such as poly(amide-imide) resins. More particularly, the invention is directed to maximizing operating temperatures of these thermoplastic composites by substantially reducing organic solvent content of the prepreg layers that make up the composite article.

BACKGROUND OF THE INVENTION

A composite article may be formed of multiple layers of a reinforcing material impregnated with a thermoplastic or heat fusible resin. Each layer that makes up the composite is generally separately impregnated with resin prior to layup, forming a "prepreg". After forming the article from multiple layers of prepreg, the article is consolidated by subjecting it to heat and/or pressure which causes the resin to fully penetrate and join all layers of the prepreg together. If the resin employed is of the thermoplastic type, then the article is simply cooled to harden the resin to produce the fully consolidated article.

One group of thermoplastic resins of interest includes a poly(amide-imide) polymer. The amide component of the polymer contributes strength and flexibility to finished composites. The imide component lends thermal stability at relatively high temperatures, on the order of 500° F. or more. The poly(amide-imide) resin is particularly useful for forming composites suitable for use in aircraft surfaces or in aerospace components that are subjected to high operating temperatures.

In forming prepregs suitable for layering to make consolidated articles, a poly(amide-imide) resin is first diluted in an organic solvent such as N-methyl-2pyrrolidone (NMP). The resin, which may include up to about 50% solvent, is then impregnated into a reinforcing material such as a woven fabric of carbon fibers, by dipping the material into a bath of the resin solution. After the reinforcing material leaves the resin dip tank, it is directed between two opposing rollers that squeeze out excess resin. Residual solvent is then removed by passing the soaked reinforcing material through a drying oven operated at a relatively low temperature. Temperature levels are typically held to low levels to avoid causing the resin to advance in molecular weight, known to adversely affect processibility in subsequent formation into composite articles. The low temperatures employed are generally only capable of removing solvent such as NMP to a residual content of about 4% by weight of the impregnated material.

Composite products of thermoplastic poly(amide-imide) resins are typically characterized by maximum operating temperatures that are generally substantially less than would be expected in light of the melting temperature of the pure resin. The presence of residual organic solvents, used in forming the prepreg has been determined to have a profound adverse effect upon the maximum use temperature of these poly(amide-imide) composites. For example, residual N-methyl-2-pyrrolidone solvent in a composite laminant will lower the glass transition temperature and consequently the maximum temperature at which the composite may be employed by as much as 100° F.

Prior workers have found that removing solvent during composite article consolidation operations is extremely difficult. Processes that employ heating cycles that attempt to boil off the solvent at relatively low temperature under vacuum have not been successful because of the low diffusively of the solvent from the assembled composite article.

Where higher temperatures are employed, there is the danger of advancement of the molecular weight of the resin. The resin is extremely viscous and if the molecular weight of the resin is advanced significantly by exposure to high temperature, the polymer matrix simply will not flow to fully impregnate and join together the layered fibrous reinforcing materials.

The difficulty of solvent removal has long been of concern in an effort to produce void-free composites of resins that advance or cure at temperatures that limit solvent removal conditions. The difficulty is particularly evident in polyimide systems, for example, that may evolve significant water when the polymer is produced. Thus, Lubowitz et al. in U.S. 3,565,549 and U.S. 3,697,308 employ various heating sequences to evaporate solvents used in forming a polyimide prepreg, but still produces laminants that include on the order of 2% volatiles, resulting in a substantial reduction in strength of the finished composite. Pike in U.S. 4,601,945 forms composite articles from aqueous solutions of polyimide precursors. While achieving a 0.7% void volume content by employing staged heating with low pressure intervals to allow reaction water to escape, the process is time consuming.

There remains a need in the technical field for methods of producing prepregs that include a reduced volatile content such that final composites are substantially void-free and thus attain a maximum strength article having predictable and reliable strength characteristics.

DISCLOSURE OF THE INVENTION

It is an object of the present invention to make fiber reinforced thermoplastic matrix composite articles from resin-solvent impregnated prepregs such that the composites have a glass transition temperature that is substantially that of the pure thermoplastic polymer. It is an object of the method of the invention to produce composite articles that have a very low residual of solvent remaining, such that the operating temperature of the composite article is maximized. It is a particular object of the invention to produce such substantially void-free composites from poly(amide-imide) resins.

The method of the invention requires impregnating a fibrous reinforcing material with a thermoplastic resin, such as a poly(amide-imide) resin, that is dissolved in an organic solvent, forming a prepreg. The resin is characterized a heat fusible at an elevated temperature that is above the boiling point of the solvent. The prepreg is rapidly elevated in temperature, substantially above the boiling point of the organic solvent, to a level that is just about that where the resin begins to advance in molecular weight. The prepreg is maintained at the elevated temperature such that the organic solvent rapidly evaporates from the prepreg. The prepreg is rapidly reduced in temperature before the resin significantly advances in molecular weight. The resulting prepreg included a substantially reduced solvent content, preferably less than 1.0% by weight. Composite articles formed of such prepregs and properly consolidated will have glass transition temperatures that are about equal to those of the pure poly(amide-imide) polymer component of the resin.

Finished composite articles are produced by forming a composite article of layers of the prepreg. The composite is then elevated in temperature to evaporate more residual solvent and subsequently to a still higher temperature, at which the viscosity of the poly(amide-imide) resin is minimized. A pressure differential is applied to the article while the resin is at its minimum viscosity such that the article is squeezed together and the resin caused to flow and fully impregnate the article reinforcing materials. Preferably, the pressure is maintained while the article is cooled to a hardened state. Such articles may have residual solvent contents of on the order of 0.2% or less and are substantially void-free.

BEST MODE FOR CARRYING OUT THE INVENTION

A preferred thermoplastic resin system for forming the prepregs and composite articles of the invention includes poly(amide-imide) polymers. These polymers are thermoplastic, that is heat fusible, and are characterized by high glass transition temperatures on the order of above 500° F. For example, a series of aromatic poly(amide-imide) polymers suitable for use in the invention is TORLON TM, having a Tg of 527±5° F. manufactured by Amoco Chemicals Corporation of Chicago, Ill. At their Tg, these polymers are viscous, gel-like materials that reach a minimum viscosity. Preferably, any consolidating processes in forming composite articles occurs at the temperature where viscosity is at a minimum. The poly(amide-imide) polymer is somewhat reactive and undergoes advancement in molecular weight when held for a significant period above about 500° F. Viscosity increases and consolidation becomes significantly more difficult, and eventually impractical as the polymer will no longer flow. Thus, in processing the polymer to ultimately produce composite articles that are fully consolidated, it is necessary to exercise care to avoid elevating the temperature of the polymer to the point where any significant advancement occurs.

The methods of the invention are directed to producing void-free composites that have operating temperatures that are substantially those of the pure poly(amide-imide) resin. Such composites require that no additives be present in the resin mixture used that might remain in the finished composite that will lower the composites' glass transition temperature. In particular, the result desired herein requires that solvent remaining in a finished composite article be as low as possible, on the order of less than 0.2% by weight and most preferably less than 0.1% by weight.

The composites of the invention are made by first preparing a prepreg by the conventional method described in the background above. The poly(amide-imide) polymer is dissolved in a solvent, preferably N-methyl-2-pyrrolidone (NMP), forming a resin solution A prepreg is formed by passing a web of reinforcing material through the resin solution, followed by conventional oven drying until less than 4% by weight solvent remains.

The partially dried prepreg is then subjected to rapid heating, up to about 550°–650° F., for the poly(amide-imide) and NMP system. The temperature is held at the elevated level until the solvent residual is less than about 1% by weight of the prepreg. As soon as the low solvent residual is achieved, the prepreg is rapidly cooled to reduce the temperature substantially below that level at which the resin begins to advance.

The method requires that the entire heating and cooling cycle be conducted before the resin begins to significantly increase in molecular weight. As a matter of maintaining the process ability i.e., consolidatability of the system. It has been discovered that the relatively short exposure time to high temperatures, on the order of about 1–5 minutes, does not effect the consolidatability of the resin, apparently because the reaction rate of advancement is relatively slow and thus, does not proceed significantly during the short time period available at elevated temperature.

The finished prepreg may then be assembled into a composite article. The prepreg is cut to desired shapes and a plurality of layers of the prepreg are stacked to achieve the ultimate desired thickness and strength of the composite. The assembled article is then subjected to elevated temperature, at about 550° F. for the poly(amide- imide)-NMP system, to drive off further solvent. Pressure is then applied to the article at a rapid rate, at least about 40 psi/minute to about 150–190 psig, to squeeze the layers together and cause the resin to flow to fully penetrate and join the reinforcing material into a unified, consolidated article. The temperature of the article is then reduced and after the resin hardens, the pressure released, producing a fully consolidated, void-free article having an operating temperature that is about equal to the glass transition temperature of the pure resin. Solvent content of the finished composite is generally less than 0.1% by weight and may be significantly lower.

The choice of the resin polymer for forming a composite article is a matter of the characteristics of the polymer, such as maximum operating temperature desired, as indicated by the polymer glass transition temperature. The second key factor in choice of resin is processability, i.e. the ability to form a prepreg that can be formed into a composite having the desired finished operating properties. Maintaining processability requires that the methods employed to achieve the maximum operating temperature or Tg not interfere with the consolidation process. Thus, the methods of the invention, employing elevated temperatures to drive off solvent, must not cause the resin to significantly advance in molecular weight and, hence, increase in minimum viscosity to a level where the resin will not flow to produce the consolidated composite.

The solvent selected may be any organic solvent that does not react with the system and has a boiling point significantly below that temperature at which the selected thermoplastic polymer begins to advance. The temperature differential must be sufficient such that the solvent may be evaporated to the desired level within the short time available before the polymer begins to react. A wide range of solvents, in addition to the preferred N-methyl-2pyrrolidone, are well-known by those skilled in the art.

EXAMPLE

A reinforcing material consisting of a plain weave fabric of carbon fibers, Product 3K-70-PW, manufactured by Celion Corporation, 42 inches wide by 100 feet long and 0.008 inches thick was impregnated with a poly(amide-imide)NMP resin solution, including 50% poly(amide-imide). The resin polymer is TORLON TM AIX 638, manufactured by AMOCO Chemical Corporation of Chicago, Ill. The web was squeezed to remove excess resin and dried to about 4% by weight residual solvent level. The web was then increased in temperature in accordance with the methods of the invention to 650° F. and held at the elevated temperature for about three minutes.

A series of trials resulted in prepregs having a resin content of 38-42% by weight and a residual solvent content of 0.7-1.2% by weight.

A 14 inch by 14 inch laminant was formed of 24 plies of the prepreg prepared above. The laminant was heated to 550° F. until solvent was reduced further and then subjected to a pressure of 185 psig applied, at 50 psi/minute, acting on the laminant to squeeze the plies together and cause the resin to flow to fully impregnate and join the prepreg layers together.

A series of trials in making such laminants resulted in laminated composite articles having glass transition temperatures of 470°-500° F., a residual NMP solvent content of 0.04-0.07% by weight of the laminant. Examination of 50X photomicrographs of cross-sections of the laminants showed no visible voids present.

From the foregoing, it will be appreciated that, although embodiments of the invention have been described herein for purposes of illustration, various modifications may be made without deviating from the spirit and scope of the invention. Accordingly, the invention is not limited except as by the appended claims.

We claim:

1. A method of making and treating a pre-impregnated fiber reinforced poly(amide-imide) material, comprising the steps of:
    impregnating a fibrous reinforcing material with a poly(amide-imide) resin dissolved in an organic solvent to form a prepreg, said poly(amide-imide) resin being heat fusible at an elevated temperature that is above the boiling point of said solvent;
    drying the prepreg at a temperature of less than 550°-650° F. until approximately 4%, by weight, of the solvent remains;
    elevating the temperature of said prepreg to an elevated temperature in the range of about 550°-650° F., said elevated temperature being substantially above the boiling point of the solvent and being approximately equal to the temperature where said resin begins to advance in molecular weight;
    maintaining said elevated temperature for approximately 1 to 5 minutes such that said solvent substantially completely evaporates from said prepreg; and
    reducing the temperature of said prepreg before the resin advances in molecular weight sufficiently to cause a substantial adverse effect on consolidatability,
    wherein after the step of reducing the temperature of the prepreg, the prepreg has a substantially reduced solvent content, and is heat fusible to form a composite article having a glass transition temperature that is about that of the pure poly(amide-imide) resin.

2. The method of claim 1 wherein after the step of reducing the temperature of the prepreg, the solvent remaining in the prepreg is less than about 1%, by weight, of said prepreg.

3. The method of claim 2 further comprising the steps of:
    forming a composite article from said prepreg;
    elevating the temperature of said article such that further residual solvent is evaporated and said poly(amide-imide) resin viscosity is minimized;
    applying a pressure differential to said article while the resin is at a minimum viscosity which pressure squeezes said article and causes said resin to flow and fully impregnate said article; and
    cooling said article while maintaining said elevated pressure on said article, whereby said resin hardens and a substantially void-free composite results.

4. The method of claim 3 wherein after the step of cooling said article, solvent remaining in said composite article is less than about 0.2%, by weight, of said article.

5. The method of claim 3 wherein the solvent is N-methyl-2-pyrrolidone, and composite articles which are formed of said prepreg and are fully hardened are characterized by a glass transition temperature of about 470-500 degrees F. (243-260degrees C.).

6. The method of claim 1 wherein said elevated temperature is about 650° F. (343° C.).

7. A method of treating a prepreg made of fiber preimpregnated with poly(amide-imide) resin, said prepreg having a solvent content of about 4%, by weight, and said prepreg being suitable for use in making a composite article, comprising the steps of:
    elevating the temperature of the prepreg to an elevated temperature in the range of about 550°-650° F., said elevated temperature being substantially above the boiling point of the solvent and approximately equal to the temperature where the poly(amide-imide) resin begins to advance in molecular weight;
    maintaining the elevated temperature for approximately 1 to 5 minutes so that substantially all the solvent evaporates from the prepreg; and
    reducing the temperature of the prepreg before the poly(amide-imide) resin advances in molecular weight sufficiently to cause a substantial adverse effect on consolidatability,
    wherein the steps of elevating the temperature, maintaining the elevated temperature, and reducing the temperature are accomplished before the prepreg is used to make a composite article, and wherein after the step of reducing the temperature of the prepreg, the solvent content of the prepreg is less than about 1%, by weight.

8. The method of claim 7 wherein said elevated temperature is approximately 650° F. (343° C.).

9. The method of claim 7 wherein after the step of reducing the temperature of the prepreg, the prepreg is characterized by a glass transition temperature of about 470°-500° F. (243°-260° C.).

10. The method of claim 7 further comprising the steps of:
    forming a composite article from the prepreg;
    elevating the temperature of the article such that substantially all residual solvent in the prepreg is evaporated and the resin viscosity of the poly(amide-imide) resin is minimized;
    applying a pressure differential to the article while the resin is at minimum viscosity, where the pressure squeezes the article together and causes the resin to flow and fully impregnate the article; and
    cooling the article while maintaining a pressure differential on the article, whereby the resin hardens to form a substantially void-free composite article.

* * * * *